United States Patent [19]
Orlandini et al.
[11] 3,729,687
[45] Apr. 24, 1973

[54] SYSTEM FOR SELECTIVE FREQUENCY AMPLIFICATION OR ATTENUATION

[75] Inventors: Antonio Orlandini; Massimo Pazzaglia, both of Milan, Italy

[73] Assignee: Societa Italiana Telecomunicazioni Siemens S.p.A., Milano, Italy

[22] Filed: May 10, 1971

[21] Appl. No.: 141,835

[30] Foreign Application Priority Data

May 8, 1970 Italy ....24305 A/70

[52] U.S. Cl. ....330/51, 330/21, 330/85, 330/109

[51] Int. Cl. ....H03f 1/34

[58] Field of Search ....330/107, 109, 51, 330/110, 21, 31, 85; 331/141

[56] References Cited

UNITED STATES PATENTS 2,490,805 12/1949 Hastings ....330/109 X
2,888,526 5/1959 Stockman ....330/109 X

OTHER PUBLICATIONS

Hedge, "Wien Bridge Analyzer," Radio–Electronics January 1958, pp 46–48

*Primary Examiner*—Roy Lake
*Assistant Examiner*—James B. Mullins
*Attorney*—Karl F. Ross

[57] ABSTRACT

Two signal generators of identical frequency and opposite phase, constituted by internal circuits of an amplifier with two mutually phase-reversed outputs, from two adjoining arms of a bridge network whose other two arms are a series R/C circuit and a parallel R/C circuit, respectively. The output diagonal of the bridge is defined by the junction of the two R/C circuits and by the grounded input terminal of the amplifier; the signal developed across this output diagonal disappears — i.e., the bridge is balanced — for any frequency bearing a predetermined relationship with the impedances of these circuits. Depending on whether the bridge network is inserted in the forward path or in the negative-feedback loop of another amplifier, frequencies determined by the adjustment of these impedances can be selectively attenuated or boosted.

2 Claims, 6 Drawing Figures

Antonio Orlandini
Massimo Pazzaglia
INVENTORS.

BY

Karl F. Ross
Attorney

Patented April 24, 1973

3,729,687

3 Sheets-Sheet 2

INVENTORS:
Antonio Orlandini
Massimo Pazzaglia
BY
Karl F. Ross
Attorney

Patented April 24, 1973 3,729,687

3 Sheets-Sheet 3

Antonio Orlandini
Massimo Pazzaglia
INVENTORS.

BY

Karl F. Ross
Attorney

SYSTEM FOR SELECTIVE FREQUENCY AMPLIFICATION OR ATTENUATION

Our present invention relates to a system for the selective amplification or attenuation of certain frequencies in a multifrequency signal, e.g., in a band of audio frequencies fed to a loudspeaker or similar transducer of a record player and other sound-reproducing equipment.

Conventional systems for controlling the tonal quality of such sound reproducers employ a multiplicity of cascaded active or passive filter networks which can be individually inserted or excluded for the selective boosting or damping of particular frequency bands.

An object of our present invention is to provide an improved control system for the purpose set forth which enables the shifting of a band of selected frequencies, subject to amplification or attenuation, to any position within a given range, thereby dispensing with the need for a multiplicity of filters tuned to specific frequency bands.

A more specific object is to provide means in such a system enabling the generation of vibrato and tremolo effects.

These objects are realized, pursuant to our present invention, with the aid of a bridge network having a pair of reactive arms, as in a conventional Wien bridge, one of these arms including a first resistance and capacitance in series whereas the other arm comprises a second resistance and capacitance in parallel. Two generators of AC signals in the remaining bridge arms operate on identical frequencies but with relatively inverted phase, their junction defining an advantageously grounded first terminal of an output diagonal whose second terminal is the junction of the two reactive arms. With proper choice of the impedances of these reactive bridge arms, the load voltage developed across the output diagonal at the operating frequency of the two generators is minimized or completely suppressed.

If the two generators in the reactive bridge arms are constituted by internal circuits of an amplifier energized with a multifrequency input signal, the resulting output signal will lack a singular frequency (hereinafter referred to as elimination frequency) determined by the relative magnitudes of the bridge impedances while other, neighboring frequencies are attenuated to a greater or less extent. Since the resistive component of a bridge arm can be represented in whole or in part by the internal impedance of an amplifier and can therefore be readily modified in response to a control signal, the elimination frequency can be shifted at will within the range of adjustability.

If the bridge network with its two phase-opposed frequency generators (represented by a signal amplifier with two relatively inverting outputs) is connected in the negative-feedback path of a further amplifier, the elimination frequency of the bridge network and adjoining signal frequencies will appear with increased amplitude in the output of that further amplifier. By selectively switching the network between the forward and feedback paths of the latter, a changeover between selective damping and selective boosting is possible. Tremolo and vibrato effects can be realized by a rapid switchover between these two paths, e.g., in response to an alternating control voltage.

It will be apparent that several such bridge networks can be cascaded to enable selective attenuation and/or amplification of several frequency bands at the same time.

The above and other features of our invention will be described in detail hereinafter with reference to the accompanying drawing in which.

Figure 1:
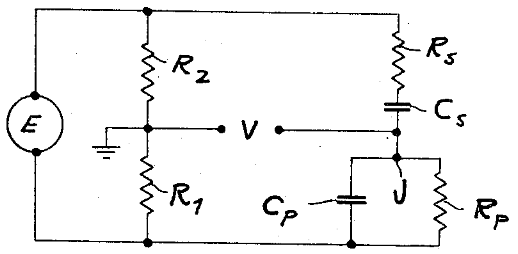
FIG. 1 shows a conventional bridge network.

The bridge network of FIG. 1 has two resistive arms $R_1$, $R_2$, a reactive third arm consisting of a resistor $R_s$ and a capacitor $C_s$ in series, and a reactive fourth arm consisting of a resistor $R_p$ and a capacitor $C_p$ in parallel.

A driving voltage E, impressed upon the input diagonal of the bridge, gives rise to a load voltage V appearing across the output diagonal, i.e., between the grounded junction of the two resistive arms and the ungrounded junction J of the two reactive arms.

It can be shown that the circuit of FIG. 1, known as a Wien bridge, is in balance if, for an input signal E of a frequency $f=\omega/2\pi$, $$R_2/R_1=R_s/R_p+C_s/C_p \qquad (1)$$

and $$\omega^2 C_s C_p R_s R_p = 1 \qquad (b2)$$

Thus, if the bridge initially satisfies equation (1), there exists one input frequency $f$ for which equation (2) is also satisfied and which is therefore suppressed in the output V. Moreover, this elimination frequency $f$ can be changed by jointly varying either $R_s$ and $R_p$ or $C_s$ and $C_p$ in a manner keeping the ratios of these impedances constant.

Such an impedance variation, particularly by electronic means, is difficult to realize with the bridge network of FIG. 1 since the grounding of one output terminal, as shown, necessitates the use of two "floating" (i.e., ungrounded) input terminals, or vice versa.

Figure 2:
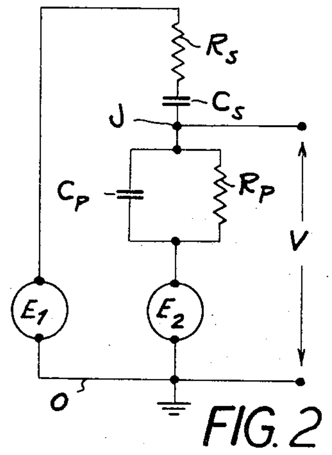
FIG. 2 illustrates a modified bridge network forming part of a frequency-control system according to the invention.

This disadvantage is avoided, in accordance with our present invention and as shown in FIG. 2, by replacing the two resistive bridge arms of FIG. 1 as well as the associated signal source $E$ with a pair of signal sources $E_1$, $E_2$ connected to a common ground 0 which also constitutes one of the terminals of the output diagonal generating the signal V. In order to preserve the original relationship of input to output voltages, input signals $E_1$ and $E_2$ must satisfy the following relationships with reference to source voltage $E$ and resistances $R_1$ and $R_2$ of FIG. 1:

$$E_1=E\,(R_2/R_1+R_2)$$

and $$E_2 = -E(R_1/R_1 + R_2)$$

whence $$E_1/E_2 = -R_2/R_1 = -(R_s/R_p + C_s/C_p) \quad (3)$$

Figure 3:
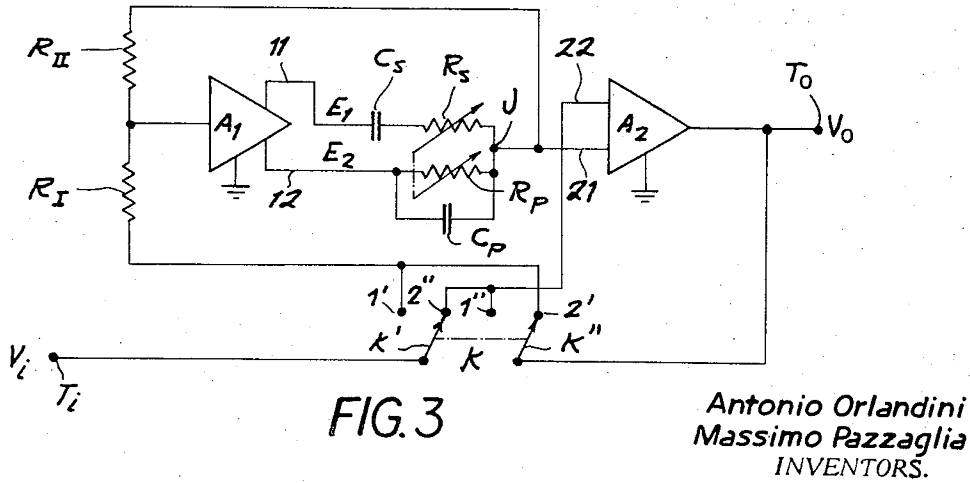
FIG. 3 is a diagram of an overall circuit arrangement including a bridge network generally similar to that of FIG. 2.

The signal sources $E_1$, $E_2$ may be constituted by internal circuits of an amplifier $A_1$, FIG. 3, having two outputs 11 and 12 180° out of phase; the bridge arm comprising shunt resistor $R_p$ and shunt condenser $C_p$ is connected to output 12 whereas the bridge arm formed by series resistor $R_s$ and series condenser $C_s$ is joined to output 11. A feedback resistor $R_{II}$ is inserted between the junction J of these bridge arms and the input of amplifier $A_1$, this input being also connected via a resistor $R_I$ to a pair of contacts 1', 2' of a double-pole, double-throw switch K having a second contact pair 1'', 2'' connected to an inverting input 22 of a second amplifier $A_2$ whose noninverting input 21 is tied to the junction J. A terminal $T_i$, carrying a multifrequency input signal $V_i$, is connected to one arm $k'$ of switch K whose other arm $k''$ is joined to the output terminal $T_o$ of amplifier $A_2$ which generates a load signal $V_0$.

With the arms of switch K on contacts 2' and 2'', as shown, signal $V_i$ is directly applied to the input 22 of amplifier $A_2$ whereas bridge network $A_1$, $C_s$, $R_s$, $C_p$, $R_p$ lies in a negative-feedback path of that amplifier extending from its output via switch arm $k''$ and resistor $R_I$ to its input 21. Resistors $R_s$ and $R_p$ are shown ganged for simultaneous adjustment, e.g., manually, and by their setting determine the elimination frequency at the center of an attenuation band which decreases the feedback factor for the frequencies in that band and therefore makes them more prominent in the output signal $V_o$. Upon a reversal of switch K, the bridge network lies in the forward path extending from input terminal $R_i$ by way of switch arm k' $T_{resistor\ R1}$ to the noninverting input 21 of amplifier $A_2$ whereby the selective attenuation introduced by that network is reflected in the output signal $V_o$. The 180° phase shift occurring upon reversal of switch K' is, of course, of no consequence for the acoustic reproduction of the audio-frequency signal $V_i$.

If, for simplification, $R_s = R_p = R$ and $C_s = C_p = C$, conditions (2) and (3) are reduced to $$\omega^2 R^2 C^2 = 1 \quad (2')$$

and $$E_1/E_2 = -2 \quad (3')\,0,$$

and

Figure 4:
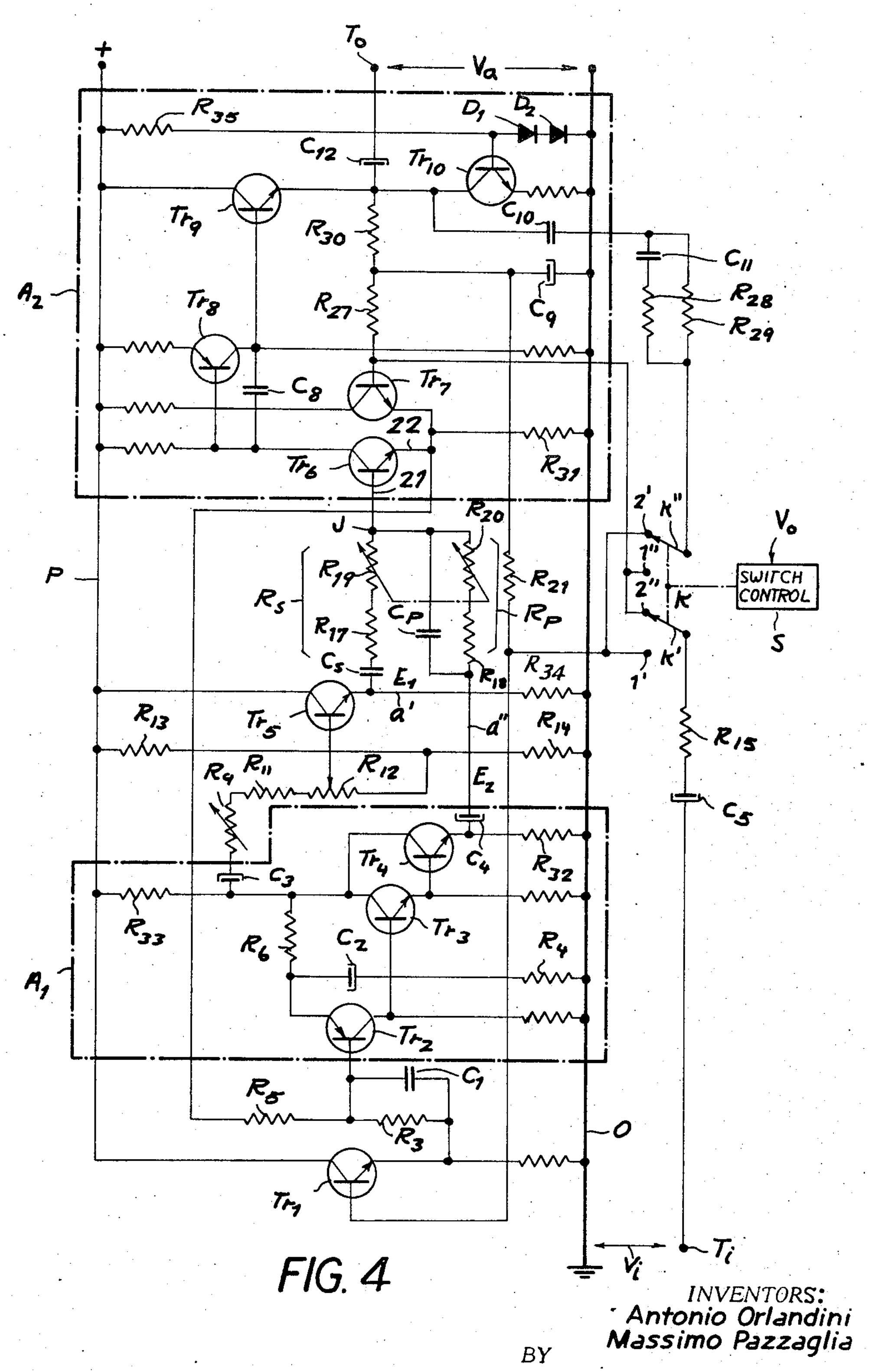
FIG. 4 is a detailed circuit diagram for the system of FIG. 3.

In FIG. 4 we have shown details of the internal connections of amplifiers $A_1$ and $A_2$. An input transistor $Tr_1$ of the emitter-follower NPN type, connected between a positive bus bar P and a ground bus bar O, has its base tied to contacts 1' and 2' of switch K. Amplifier $A_1$ comprises three transistor stages $Tr_2$ (PNP), $Tr_3$ (NPN) an d $Tr_4$ (NPN), the base of transistor $Tr_2$ being connected to the emitter of transistor $Tr_1$ through an R/C network $R_3$, $C_1$ and to ground through a voltage divider comprising a pair of resistors $R_5$, $R_{31}$. Transistor $Tr_2$ has its emitter connected to the collectors of transistors $Tr_3$ and $Tr_4$ through a resistor $R_6$ and to ground through a condenser $C_2$ in series with a resistor $R_4$. The two cascaded NPN stages $Tr_3$ and $Tr_4$ operate as emitter followers, stage $Tr_4$ having its emitter grounded through a resistor $R_{32}$ and connected to a capacitor $C_4$ while having its collector connected (together with that of stage $Tr_3$) to bus bar P through a resistor $R_{33}$, these two collectors being tied to another capacitor $C_3$. A further emitter-follower NPN transistor $Tr_5$ has its base connected to a tap on a potentiometer $R_{12}$ which forms part of a voltage divider, also including a variable resistor $R_9$ and a fixed resistor $R_{11}$, connected between the junction of two resistors $R_{13}$, $R_{14}$ and capacitor $C_3$; resistors $R_{13}$ and $R_{14}$ constitute a voltage divider inserted between high potential and ground to provide the proper biasing voltage for transistor $Tr_5$. The settings of variable capacitors $C_2$, $C_3$, $C_4$ are so chosen, together with that of variable resistor $R_9$, that the output voltage $E_1$ of transistor $Tr_5$, developed across an emitter resistor $R_{34}$, and the output voltage $E_2$, delivered by capacitor $C_4$, are of opposite phase and of absolute magnitudes in the ratio 2:1, thereby satisfying the aforestated conditions (2') and (3') for the proper functioning of the bridge network.

Resistors $R_s$ and $R_p$ are shown in FIG. 4 as split into two portions $R_{17}$, $R_{19}$ and $R_{18}$, $R_{20}$, respectively, with only the portions $R_{19}$ and $R_{20}$ adjustable and ganged for simultaneous setting.

Amplifier $A_2$ includes two NPN stages $Tr_6$ and $Tr_7$ with their emitters grounded through resistor $R_{31}$, a PNP stage $Tr_8$ driven from the collector of transistor $Tr_6$ and provided with a phase-correcting shunt capacitor $C_8$ between its base and collector, a further NPN transistor $Tr_9$ driven from stage $Tr_8$, and an NPN transistor $Tr_{10}$ in tandem with transistor $Tr_9$. Transistor $Tr_7$ forms part of a feedback path which includes two series resistors $R_{27}$ and $R_{30}$ connected between the base of transistor $Tr_7$ and the junction of the emitter of transistor $Tr_9$ with the collector of transistor $Tr_{10}$, the latter junction being coupled to terminal $T_o$ by way of a condenser $C_{12}$. The base of transistor $Tr_{10}$ is biased by a voltage divider including a resistor $R_{35}$ and the combined forward resistance of two series-connected diodes $D_1$, $D_2$.

The base and emitter leads of transistor $Tr_6$ respectively constitute the noninverting and inverting inputs 21, 22 of amplifier $A_2$ shown in FIG. 3. In the illustrated position of switch K, input signal $V_i$ passes from terminal $T_i$ via a condenser $C_5$ and a resistor $R_{15}$ to the base of transistor $Tr_8$ to energize the output terminal $T_o$. At the same time, a negative-feedback path for amplifier $A_2$ is established from the emitter of transistor $Tr_9$ through a coupling condenser $C_{10}$, a phase-correcting network $C_{11}$, $R_{28}$, $R_{29}$ and switch arm $k''$ to the base of transistor $Tr_1$, thence through amplifier $A_1$ to input 21. In the alternate switch position, the signal $V_i$ reaches the input stage $Tr_1$ directly through switch arm $k'$ while the feedback path extends from network $C_{11}$, $R_{28}$, $R_{29}$ via arm $k''$ to the base of transistor $Tr_7$ and thence to input 22. Thus, the system operates in the manner already described with reference to FIG. 3.

The potentials of switch contacts 1', 2' and 1'', 2'' are equalized via base resistor $R_{27}$ and a further resistor $R_{21}$ to prevent arcing during switchover; a bypass condenser $C_9$ serves to eliminate low-frequency hum in the input of transistor $Tr_7$. Transistor $Ir_{10}$ has the task of blocking the output stage $Tr_9$ of amplifier $A_2$ if the supply voltage on bus bar P drops below a predetermined level. A mechanical or electronic switch control S may be used for periodically reversing the switch K, in response to a control voltage $V_c$ of suitable frequency, to create a tremolo or vibrato effect.

Figure 5:
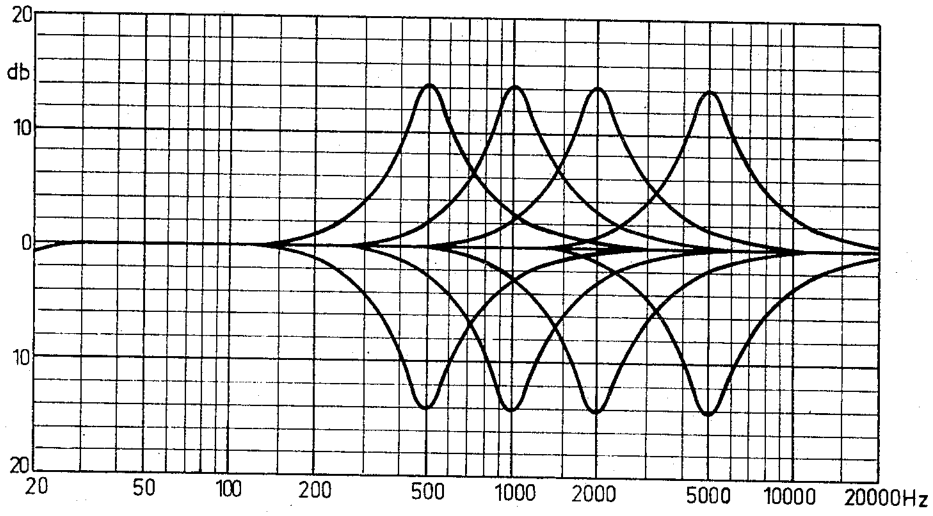
FIG. 5 is a graph illustrating the shifting of a selectively amplified or attenuated band over a range of signal frequencies.

The setting of resistors $R_{19}$ and $R_{20}$ may be varied manually or automatically to shift the attenuation or amplification band, as shown in FIG. 5, to different regions of the range of signal frequencies here extending between 20 and 20,000 Hz; the upper limit of the range of adjustability is determined by the resistors $R_{17}$ and $R_{18}$ in FIG. 4.

Figure 6:
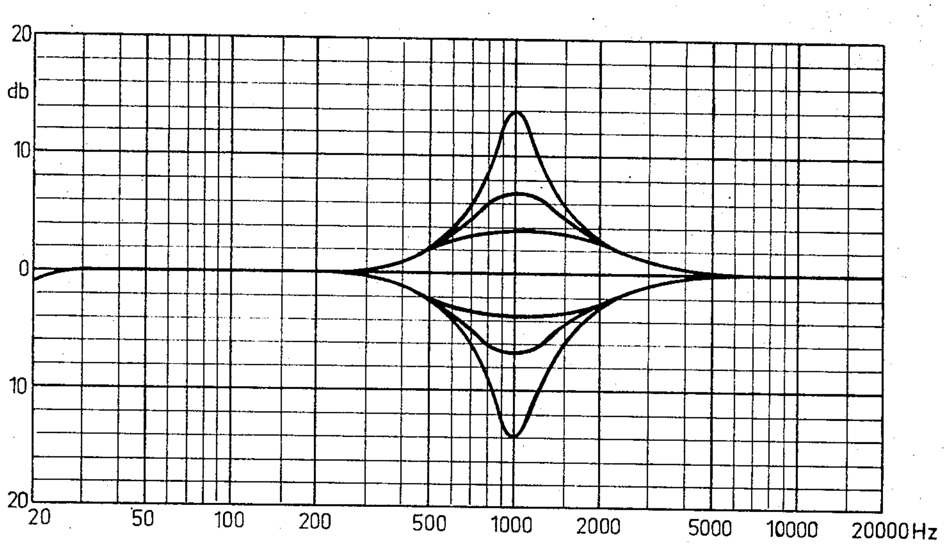
FIG. 6 is a similar graph showing different degrees of attenuation and amplification for such a band.

As illustrated in FIG. 6, such a shift may also be used to vary the attenuation or amplification of a selected frequency (e.g. of 1,000 Hz) between limits of, say, ± 14 db.

We claim:

1. A system for alternately amplifying and attenuating selected frequencies in a composite signal, comprising:
   a first amplifier having an input terminal, a grounded reference terminal and two output terminals;
   a bridge network including a series resistance and a series capacitance in a first impedance arm connected to one of said output terminals, a shunt resistance and a shunt capacitance in a second impedance arm connected to the other of said output terminals and forming a junction with said first impedance arm, and internal circuits of said first amplifier between said grounded terminal and said output terminals as additional bridge arms, said internal circuits generating output voltages with relatively inverted phase and with absolute magnitudes in a ratio substantially equaling the sum of the ratios of the resistances and of the capacitances in the impedance arms respectively connected to the corresponding output terminals, at least one impedance of said first arm and at least one impedance of said second arm being jointly adjustable;
   a second amplifier with an output lead, an inverting input and a noninverting input, said first and second impedance arms having their junction tied to one of said inputs;
   an input lead connected to a source of multifrequency signals; and
   switch means having a first position connecting said output lead to said input terminal of said first amplifier and said input lead to the other of said inputs of said second amplifier, said switch means having a second position connecting said output lead to said other of said inputs of said second amplifier and said input lead to said input terminal of said first amplifier.

2. A system as defined in claim 1 wherein said resistances are equal and said capacitances are equal, said ratio being −2:1.

* * * * *